United States Patent
Breslin et al.

(10) Patent No.: US 8,488,466 B2
(45) Date of Patent: Jul. 16, 2013

(54) SYSTEMS, METHODS, AND APPARATUS FOR DETECTING A PATTERN WITHIN A DATA PACKET AND DETECTING DATA PACKETS RELATED TO A DATA PACKET INCLUDING A DETECTED PATTERN

(75) Inventors: Terence M. Breslin, San Mateo, CA (US); David Kucharczyk, Santa Fe, NM (US); Jan Allen Hinshaw, Prescott Valley, AZ (US)

(73) Assignee: VSS Monitoring, Inc., San Mateo, CA (US)

( * ) Notice: Subject to any disclaimer, the term of this patent is extended or adjusted under 35 U.S.C. 154(b) by 281 days.

(21) Appl. No.: 12/970,857

(22) Filed: Dec. 16, 2010

(65) Prior Publication Data
US 2011/0141937 A1 Jun. 16, 2011

Related U.S. Application Data

(60) Provisional application No. 61/287,089, filed on Dec. 16, 2009.

(51) Int. Cl.
*H04L 12/26* (2006.01)
(52) U.S. Cl.
USPC .......................................................... 370/235

(58) Field of Classification Search
None
See application file for complete search history.

(56) References Cited

U.S. PATENT DOCUMENTS

| 6,523,068 | B1 * | 2/2003 | Beser et al. | 709/238 |
| 2010/0198969 | A1 * | 8/2010 | Jacoby et al. | 709/225 |

* cited by examiner

*Primary Examiner* — Minh-Trang Nguyen
(74) *Attorney, Agent, or Firm* — Edwards Wildman Palmer LLP; Scott D. Wofsy; Christopher J. Capelli

(57) ABSTRACT

Systems, devices, and methods for finding a captured data packet including a data pattern of interest and data packets associated with the found data packet are herein provided. A traffic flow of captured data packets may be received by a network captured traffic distribution device and may be duplicated. A traffic flow of captured data packets may be scanned for data packets including a data pattern of interest and identifying information may be determined for any found data packets. A duplicate traffic flow of captured data packets may also be scanned for data packets with identifying information that matches a found data packet. An egress port for the found data packet may be determined and both the found data packet and any data packets with identifying information matching found data packet might be transmitted to the determined egress port.

20 Claims, 8 Drawing Sheets

SYSTEMS, METHODS, AND APPARATUS FOR DETECTING A PATTERN WITHIN A DATA PACKET AND DETECTING DATA PACKETS RELATED TO A DATA PACKET INCLUDING A DETECTED PATTERN

RELATED APPLICATION

This application is a NONPROVISIONAL of, claims priority to, and incorporates by reference U.S. Provisional Patent Application 61/287,089 filed 16 Dec. 2009.

FIELD OF INVENTION

The present invention relates to systems, methods, apparatus, and computer-readable media for detecting a pattern within a data packet included in a traffic flow of captured data packets and detecting data packets related to a data packet including a detected pattern.

BACKGROUND

In conventional communication networks, a traffic flow of data packets transmitted through the communication network may be captured and forwarded to a network tap device. The network tap device then forwards the traffic flow of captured network traffic to one or more external monitoring devices.

One reason for capturing network traffic is to monitor the network traffic for security purposes. Traditionally, implementation of security measures within a communication network is limited to putting firewalls or filters in place to restrict traffic flowing into and/or out of the communication network or a component of the communication network. In some cases, a network tap operating under these security procedures acts to forward traffic violating a security procedure to a monitoring device regardless of the content included within the data packet.

Conventional taps lack the capacity to analyze the content or data patterns included within data packets and direct data packets to a monitoring device accordingly. Restrictions imposed on network traffic by firewalls and filters may be over-inclusive or under-inclusive as they typically block network traffic based on features not related to the content of the data packet, such as address information or size. On some occasions, the information used to filter and or firewall the communication may not be relevant to the reason why a communication may violate a security protocol. In conventional communication networks when a firewall or filter is implemented, all communications of a particular type are limited. While this may work to provide security to a communication network in some instances, communications that may violate a security protocol but are not specifically filtered or blocked based on firewall or filter specifications may be communicated through the network. For example, an e-mail exchange between two parties may be permissible under the specifications of a conventional security measure however, the content of the e-mail may violate one or more security protocols. As may occur when one party is discussing information with another party that is not authorized to receive the information. Conventional network monitoring and or security measures are unable to locate such an unsecure communication at least because they do not analyze the content of the data packet included within the communication.

SUMMARY

Systems, devices, and methods for finding, within a traffic flow of captured data packets, a captured data packet including a data pattern of interest and data packets associated with the found data packet are herein provided. A plurality of data patterns of interest may be received at a network captured traffic distribution device including a plurality of ingress and egress ports. Exemplary data patterns of interest include an Internet protocol (IP) address, a source identifier, a destination identifier, data packet size, and data packet content. In some embodiments, data patterns of interest may be tailored to comply with, for example, a regulatory scheme, a privacy policy, a communication protocol, and a legal requirement.

A traffic flow of captured data packets may also be received at the network captured traffic distribution device via, for example, a mirror port resident on a source of the captured data packets and/or a traffic capture point located along a communication link between two communicating devices. The traffic flow of captured data packets may be received at a rate of, for example, 10 megabit per second, 100 megabit per second, 1 gigabit per second, 10 gigabits per second, 40 gigabits per second, 40 gigabits per second via dense wavelength-division multiplexing, and/or 100 gigabits per second.

Data packets of the traffic flow of captured data packets may be scanned in order to find a data packet including a data pattern of interest and, for any found data packets, identifying information may be determined therefrom. Exemplary identifying information includes an IP address, a port identifier, transmission control protocol (TCP) information, a virtual local area network (VLAN) tag, a source port identifier, and a destination port identifier. A found data packet and any data packets having matching identifying information may be associated with, for example, an email communication, a communication with a web site, and a communication within a network. The data packets of the traffic flow sequentially following a found data packet may be scanned to find one or more data packets with identifying information matching identifying information of a found data packet.

Next, an egress port of the network captured traffic distribution device assigned to a found data packet may be determined. This determination may be based on any data packet parameter, such as, data packet size, content, type, transmission speed, and/or which of the data patterns of interest is found in the data packet.

A found data packet and any data packets having matching identifying information may then be transmitted to the assigned egress port. On some occasions, only a portion of the found data packet and/or a portion of any data packets having matching identifying information may be transmitted to the assigned egress port. The transmitted portion may include, for example, address information, such as a header, source information, destination information, and the data packet included in the found data packet.

In one embodiment, a found data packet including a data pattern of interest and any data packets having matching identifying information may be tagged with an egress port identifier. In this embodiment, a determination of an egress port assigned to a found data packet may be made on the basis of the egress port identifier.

In another embodiment, a duplicate traffic flow of captured data packets may be produced from the traffic flow of captured data packets. A time delayed traffic flow may then be generated using either the traffic flow of captured data packets or the duplicate traffic flow of captured data packets.

The data packets of the traffic flow of captured data packets may then be scanned to find a data packet including a data pattern of interest and, for any found data packets, identifying information may be determined therefrom. The data packets of the time delayed traffic flow may also be scanned to find one or more data packets with identifying information matching identifying information of a found data packet. The found data packet and any data packets having matching identifying information may then be transmitted to the assigned egress port.

Optionally, a found data packet and any data packets having matching identifying information may be tagged with an egress port identifier. A determination of an egress port assigned to a found data packet may be made on the basis of the egress port identifier.

Exemplary devices disclosed herein include a network captured traffic distribution device. The device may include a plurality of ingress ports, a plurality of egress ports, a splitter, a first memory, a field programmable gate array (FPGA), a processor, and/or a second memory. The plurality of ingress ports may receive a traffic flow of captured data packets from a source of captured data packets, such as a mirror port or an inline capture point. The plurality of ingress ports may also transmit the traffic flow of captured data packets to a splitter. The plurality of egress ports may transmit data from the network captured traffic distribution device to, for example, an external device.

The splitter may be communicatively coupled to one or more of the ingress ports and may be configured to receive the traffic flow of captured data packets and duplicate data packets of the traffic flow. The first memory may be communicatively coupled to the splitter and may be configured to buffer data packets, from either the traffic flow or a duplicated traffic flow, and may thereby provide a time-delayed traffic flow.

The FPGA and/or processor may be communicatively coupled to the first memory and may scan data packets included in another of the traffic flow or the duplicated traffic flow to find a data packet including a pattern of interest. The FPGA and/or processor may also determine identifying information for a found data packet, scan data packets of the time delayed traffic flow to find one or more data packets having identifying information matching that of a found data packet, and determine an egress port assigned to the found data packet. In one embodiment, the FPGA may include a pattern finder for scanning data packets using the pattern of interest and determining the identifying information for the found data packet and/or a flow filter for scanning data packets of the time delayed traffic flow and determining the egress port assigned to the found data packet.

The second memory may be communicatively coupled to the FPGA and/or processor and may be configured to store information for determining the egress port assigned to the found data packet. In one embodiment, the second memory may include a look-up table associating each data pattern of interest with a respective one of the egress ports. In another embodiment, the second memory may be a ternary content-addressable memory (TCAM).

BRIEF DESCRIPTION OF THE DRAWINGS

The present invention is illustrated by way of example, and not limitation, in the figures of the accompanying drawings in which.

DETAILED DESCRIPTION

At times, it may be desirable to scan a payload portion of a captured data packet in order to determine whether, for example, the payload portion includes a data content pattern of interest. For example, it may be desirable to scan captured data packets included in an email communication in order to determine whether any of the data packets include a keyword or graphic image of interest. It may also be desirable to determine whether any data packets similar to, or sharing identification information with, a found data packet are included in a traffic flow of captured data packets so that, for example, a found data packet may be put into context with a communication to which it belongs.

It may also be desirable to scan data packets included in a traffic flow of captured data packets for a data content pattern, an IP address, a source port number, and/or a destination port number of interest included in a set of data content patterns and/or a set of IP addresses, source port numbers, and destination port numbers. When a data packet including a data content pattern of interest is found, it may be determined whether an IP address, source port number, and/or destination port number associated with the found data packet is included in the set of IP addresses, source port numbers, and destination port numbers. When an IP address, source port number, and or destination port number is not included in the set, the set may be updated to include the missing IP address, source port number, and/or destination port number.

Figure 1:
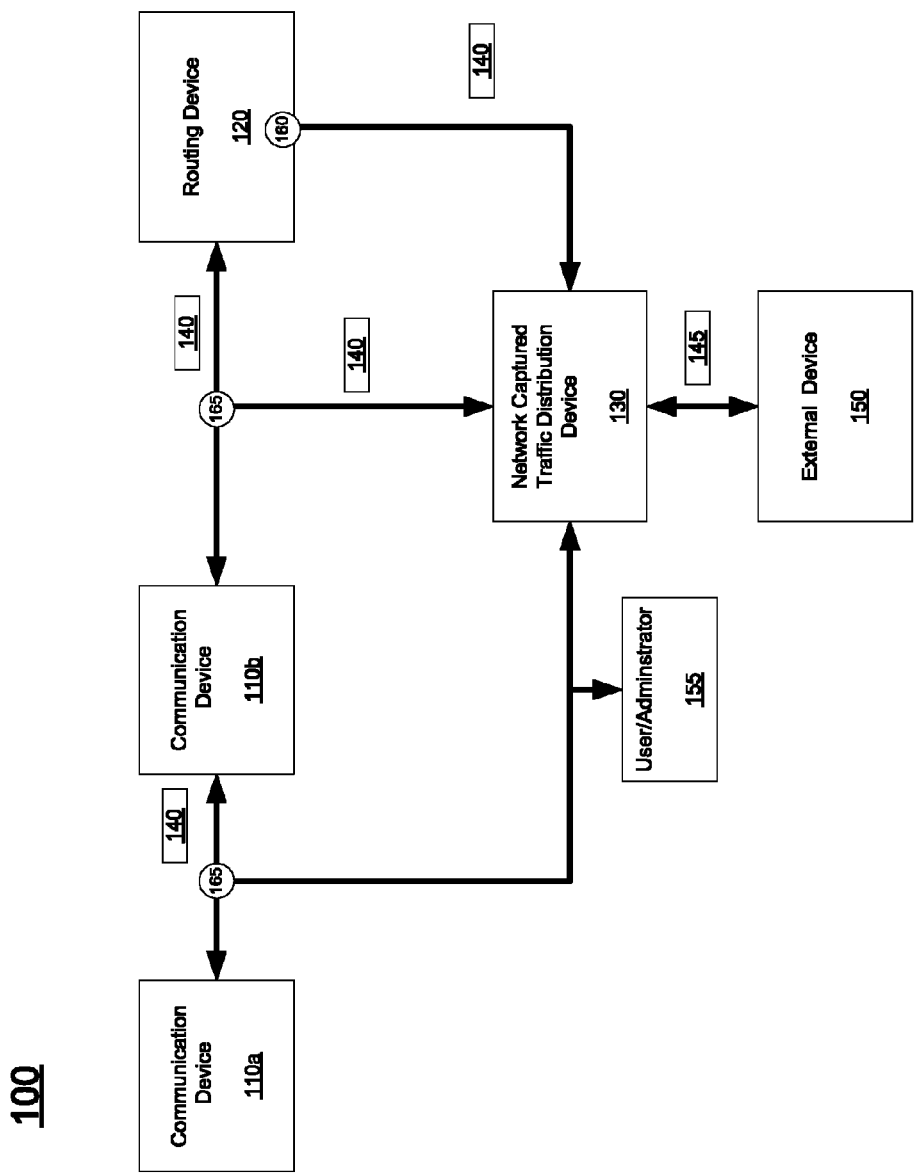
FIG. 1 is a block diagram of a network communication system, in accordance with embodiments of the present invention.

FIG. 1 is block diagram depicting a network communication system 100 in which one or more of the processes disclosed herein may be executed. System 100 may be, for example, a telecommunication system such as a Global System for Mobile communication (GSM) system or a multi-protocol label switching (MPLS) system. In some embodiments, system 100 may be Gateway General Packet Radio Service (GPRS) system, an Enhanced Data Rates for GSM Evolution (EDGE) system, an Enhanced GPRS (EGPRS) system, an International Mobile Telecommunications-2000 (IMT-2000) system, an IMT Single Carrier (IMT-SC) system, an Universal Mobile Telecommunications System (UMTS) system, a Long Term Evolution (LTE) system, a Code Division Multiple Access (CDMA) system, a system compliant with the IEEE 802.1 Q standard for configuring virtual LANs (VLAN), or a system enabled to transmit and/or receive data packets including VLAN tags. System 100 may also be a local area network (LAN) or a wireless LAN (WLAN).

The components of system 100 may be communicatively coupled via one or more communication links. The communication links may be any conventionally available communication link, such as a wireless link or a wired link such as an Ethernet cable, a 10/100 Ethernet cable, a 1 Gb Ethernet cable, a 10 Gb Ethernet cable, a copper cable, and an optical fiber cable.

System 100 may include two communication devices 110*a* and 110*b* communicatively coupled to one another. Exemplary communication devices 110 include personal computers, mobile computing devices, and mobile telephones. Communication device 110*a* may generate a data packet 140 and transmit data packet 140 to a routing device, such as routing device 120, via a communication link. Routing device 120 may be any router enabled to route data packets through communication system 100. Communication device 110*a* may also receive a data packet 140 from communication device 110*b* via a communication link.

System 100 may also include a network captured traffic distribution device 130, which may be any network captured traffic distribution device capable of receiving captured network traffic. Network captured traffic distribution device 130 may include a plurality of ingress and egress ports by which network captured traffic distribution device 130 may communicate with another device included in system 100 and receive and/or transmit captured traffic. In some cases, an egress port may be a monitor port. Network captured traffic distribution device 130 may also be communicatively coupled so as to provide information to and/or receive instructions from a user and/or administrator 155. User/administrator 155 may be, for example, a user and/or administrator of, for example, system 100 and/or network captured traffic distribution device 130.

Network captured traffic distribution device 130 may be communicatively coupled to a mirror port 160 present on routing device 120 via an ingress port and may receive a traffic flow of captured data packets, including data packet 140, from routing device 120 via mirror port 160. Network captured traffic distribution device 130 may also be communicatively coupled to a traffic capture point 165 located along a communication link between communication device 110, and routing device 120, and/or between communication devices 110*a* and 110*b* and thereby may capture data packets, like data packets 145, via an inline network traffic capture at traffic capture point 165. Network captured traffic distribution device 130 may communicate modified data packet 140 to an external device 150 via, for example, an egress port. Exemplary external devices 150 include network monitors and network analyzing devices.

Figure 2:
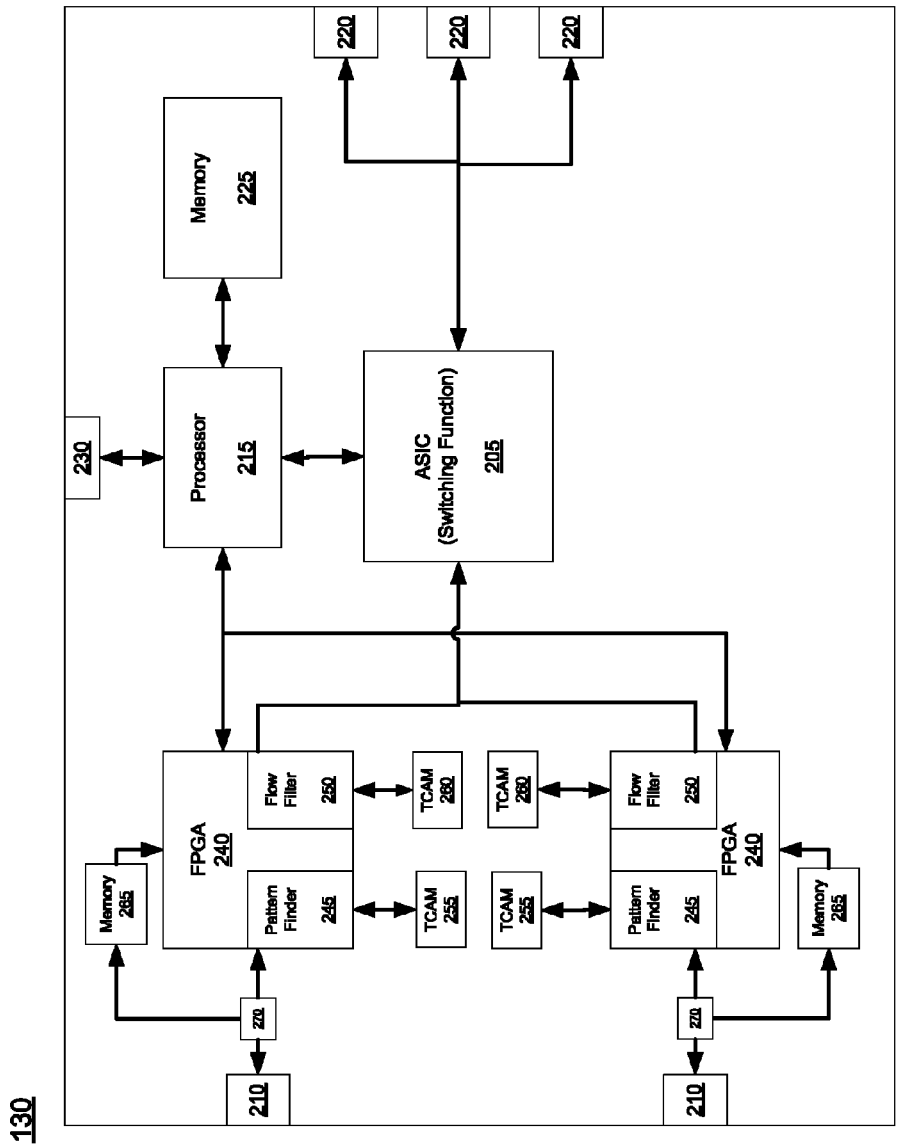
FIG. 2 is a block diagram of an exemplary network captured traffic distribution device, in accordance with embodiments of the present invention.

FIG. 2 is a block diagram illustrating an exemplary network captured traffic distribution device 130. Network captured traffic distribution device 130 includes a plurality of ingress ports 210 and a plurality of egress ports 220. One or more egress ports 220 may be configured as a monitoring and/or stacking port. Data packets such as data packet 140 may be received by network captured traffic distribution device 130 via one or more ingress ports 210. Data packets may be received from, for example, a mirror port, like mirror port 160, and/or an inline traffic capture point, like inline traffic capture point 165.

Processor 215 may be any appropriate processing device, such as a central processing unit (CPU). Processor 215 may process data packets according to one or more instructions resident in a memory, like memory 225. Memory 225 may be any appropriate data storage device such as read only memory (ROM), flash memory, optical media, magnetic media, and random access memory (RAM). Memory 225 may store one or more instructions executable by processor 215, FPGA 240, ternary content-addressable memory (TCAM) 255, TCAM 260, and/or ASIC 205. Processor 215 may be managed by, for example, a user and/or administrator, like user/administrator 155 via, for example, a management port, like management port 230.

Network captured traffic distribution device 130 may also include one or more FPGAs 240, one or more pattern finders 245, one or more flow filters 250, one or more memories 265, one or more splitters 270, a one or more ternary content-addressable memories (TCAM) 255 and one or more TCAMs 260. An FPGA 240 AP communicatively coupled with a memory 265, TCAM 255, TCAM 260, splitter 270, processor 215 and/or ASIC 205. Both flow filter 250 and pattern finder 245 may be implemented in FPGA 240. The two FPGAs 240, pattern finders 245, flow filters 250, memories 265, splitters 270, TCAMs 255, and/or TCAMs 260 shown in FIG. 2 may be individually or collectively configured and may share one or more characteristics with one another.

A user and/or administrator, such as user administrator 155, may specify or transmit, for example, configuration information and/or one or more data patterns to be scanned for in a data packet into network captured traffic distribution device 130 via, for example, management port 230 an/or an ingress port 210. These patterns may be forwarded to, for example, processor 215, pattern finder 245, and/or TCAM 255 and may be stored in, for example, TCAM 255. A new A traffic flow of captured data packets may be received by network captured traffic distribution device 130 via one or more ingress ports 210. Splitter 270 may be coupled with ingress port 210 and may be enabled to split the traffic flow of captured data packets into two or more identical, or nearly identical, traffic flows. Splitter 270 may also generate a duplicate traffic flow of captured data packets. In some cases, the first identical traffic flow may be used to generate a time delayed traffic flow of captured data packets. A time delayed traffic flow may be generated by transmitting the first identical traffic flow to a memory, like memory 265. Memory 265 may be any memory capable of temporarily storing and/or buffering captured data packets. A period of the time delay for the time delayed traffic flow may be affected by the capacity and/or functionality of memory 265. In some cases, memory 265 may act as a buffer.

The second identical traffic flow may be transmitted to, for example, FPGA 240 and/or pattern finder 245. Pattern finder 245 may scan a second identical traffic flow for one or more patterns that may have been specified by, for example, an administrator and/or user like user/administrator 155. In some cases, pattern finder 245 may operate in conjunction with TCAM 255 in order to scan for and detect one or more patterns within a data packet. In some cases, pattern finder 245 may determine identifying information associated with a found data packet including a pattern. Exemplary identifying information can include an Internet protocol (IP) address, a port identifier, transmission control protocol (TCP) information, a source identifier, and/or a destination identifier. This identifying information may then be transferred to flow filter 250. Flow filter 250 may operate in conjunction with TCAM 260 to scan for other data packets in the time delayed traffic flow that include identifying information matching the identifying information in the found data packet. Flow filter 250 and/or TCAM 260 may also act to determine an egress port, like egress port 220, assigned to a found data packet that includes a pattern. Once the egress port is determined, the found data packet may be tagged with an egress port ID and then transmitted to an ASIC, such as ASIC 205. ASIC 205 may be coupled to egress ports 210, processor 215, and one or more FPGAs 240. ASIC 205 may perform a switching function and may transmit the tagged data packet(s) to one or more egress ports 220. The tagged data packet(s) may then be transmitted to an external device, like external device 150, via an egress port 220.

Figure 3:
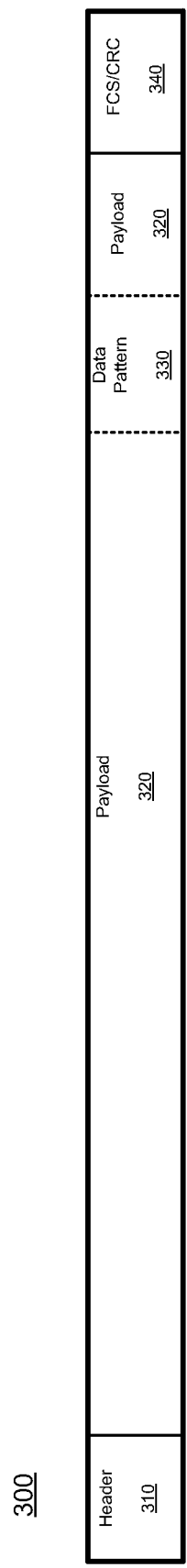
FIG. 3 is a block diagram of an exemplary data packet, in accordance with embodiments of the present invention.

FIG. 3 is a block diagram illustrating an exemplary data packet 300 including a header 310, a payload 320, a data pattern 330, and a FCS/CRC 340. Data packet 300 may resemble data packet 140. Exemplary header 310 may include, for example, address information and other information, as needed, for the transmission of data packet 300 through a network communication system, like network communication system 100. Payload 320 may include any payload or data appropriate for data packet 300. Data pattern 330 may be any pattern of data transmissible within data packet 300. Exemplary data patterns include an IP address, an email address, a search request submitted to a web site, and a content data pattern such as a name, word, or phrase. FCS/CRC 322 may include frame check sequence (FCS) and/or cyclic redundancy check (CRC) information necessary for compliance with one or more system protocols, communication protocols, and/or the routing of the packet through a network communication system, like network communication system 100.

Figure 4:
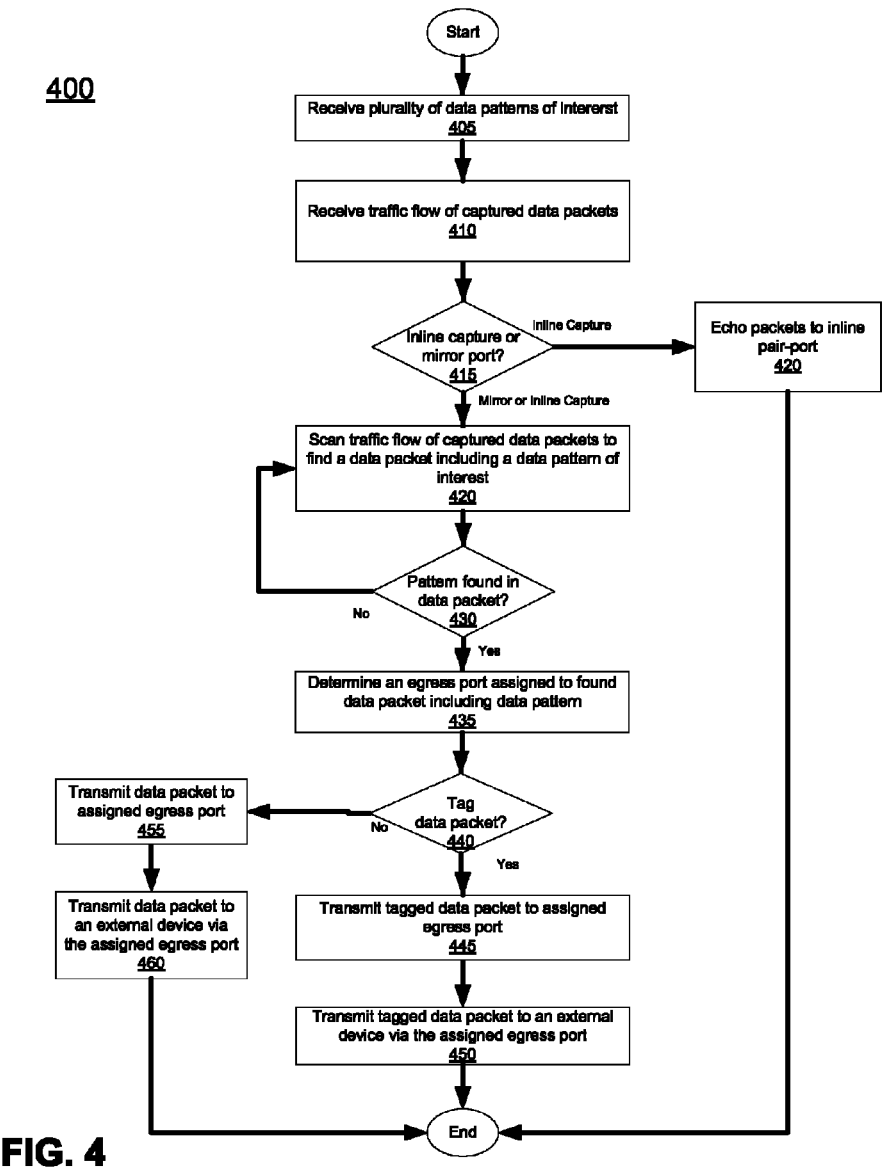
FIG. 4 is a flow diagram of an exemplary process for detecting a pattern within a data packet, in accordance with embodiments of the present invention.

FIG. 4 is a flow diagram illustrating an exemplary process 400 for detecting a pattern within a data packet. Process 400 may be executed by, for example, system 100 and/or network captured traffic distribution device 130.

In step 405, a plurality of data patterns of interest may be received by, for example, a network captured traffic distribution device such as network captured traffic distribution device 130 via, for example, an ingress port like ingress port 210 and/or a management port, like management port 230. The plurality of data patterns may be specified by, for example, a user and/or administrator, like user and/or administrator 155. In some cases, the data patterns and/or execution of process 400 may be tailored to comply with, for example, a policy, regulatory scheme, and/or a legal requirement such as a privacy policy, a policy specific to a user and/or administrator of a communication network, system 100 and/or network captured traffic distribution device 130, privacy law, a wiretapping law, and/or a communications regulatory scheme. In some cases, the data patterns of interest may be stored in a memory such as TCAM 255.

In step 410, a traffic flow of captured data packets may be received by, for example, a network communication system like system 100, a network captured traffic distribution device like network captured traffic distribution device 130, and/or an FPGA like FPGA 240. The traffic flow of captured data packets may be received via, for example, a mirror port like mirror port 160 and/or a traffic capture point located along a communication link between two communicating devices like traffic capture point 165. The traffic flow of captured data packets may be received at a rate of, for example, 1 gigabit per second, 10 gigabits per second, 40 gigabits per second, 40 gigabits per second via dense wavelength-division multiplexing, and/or 100 gigabits per second.

In step 415, it may be determined whether a data packet is received via an inline capture point or a mirror port. When a data packet is received via an inline capture point the data packet may be echoed to an inline pair port resident on, for example, a network captured traffic distribution device like network captured traffic distribution device 130 (step 420). In some embodiments, an inline pair port may be an egress port resident in, for example, the network captured traffic distribution device like egress port 220.

Whether received via a mirror port or inline capture point, in step 425 the traffic flow of captured data packets, such as data packet 140, 145, and 300, may be scanned to determine whether one or more of the data packets includes, for example, a pattern of interest from step 405. Step 425 may be performed by, for example, an FPGA, such as FPGA 240, a pattern finder, such as pattern finder 245, and/or a TCAM, such as TCAM 255. In step 430, it is determined (e.g., through a comparison of the packet contents with the patterns of interest) whether or not a data packet including one or more patterns of interest is found. Step 430 may be performed by, for example, a FPGA, such as FPGA 240, a pattern finder, such as patter finder 245, and/or a TCAM, such as TCAM 255.

In step 435, an egress port assigned to a found data packet may be determined. This determination may be based on, for example, information included in a found data packet, such as one or more of the detected pattern(s), an IP address, a port identifier, TCP information, a source identifier and/or a destination identifier. The determination of step 435 may be performed by, for example, flow filter 250 working in conjunction with, for example, TCAM 260.

It may be determined in step 440 whether a tag is inserted into a found data packet. The tag may include an egress port identifier that was determined in step 435. Step 440 may be performed by, for example, an FPGA, like FPGA 240 and/or flow filter 250. Flow filter 250 may operate in conjunction with, for example, TCAM 260.

When a tag is not inserted into a data packet, the data packet may be transmitted to its assigned egress port (step 455). Step 445 may be performed by, for example, an ASIC such as ASIC 205 and/or a switch. The tagged data packet may then be transmitted to an external device, like external device 150, via one or more egress ports, such as egress port 220 (step 460)

When a tag is inserted into a data packet, the tagged data packet may be transmitted to its assigned egress port (step 445). Step 445 may be performed by, for example, an ASIC such as ASIC 205 and/or a switch. The tagged data packet may then be transmitted to an external device, like external device 150, via one or more egress ports, such as egress port 220 (step 450).

Figure 5:
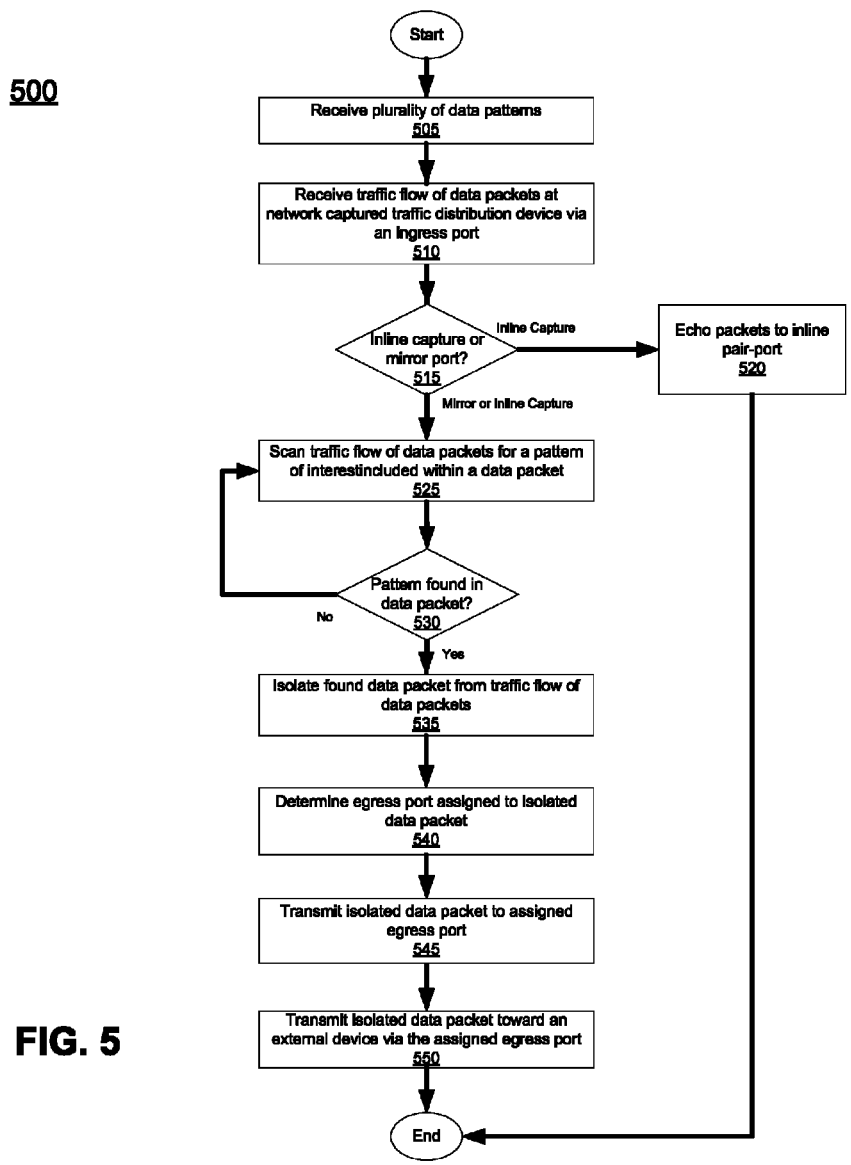
FIG. 5 is a flow diagram of an exemplary process for isolating data packets that include a data pattern, in accordance with embodiments of the present invention.

FIG. 5 is a flow diagram of an exemplary process for isolating data packets that include a data pattern of interest. Process 500 may be executed by, for example, system 100 and/or network captured traffic distribution device 130.

In step 505, a plurality of data patterns of interest may be received by, for example, a network captured traffic distribution device such as network captured traffic distribution device 130 via, for example, an ingress port like ingress port 210 and/or a management port, like management port 230. The plurality of data patterns of interest may be specified by, for example, a user and/or administrator, like user and/or administrator 155. In some cases, the data patterns and/or execution of process 500 may be tailored to comply with, for example, a regulatory scheme and/or a legal requirement such as a privacy law, a wiretapping law, and/or a communications regulatory scheme. In some cases, the data patterns of interest may be stored in a memory such as TCAM 255.

In step 510, a traffic flow of captured data packets may be received by, for example, a network communication system like system 100, a network captured traffic distribution device like network captured traffic distribution device 130, and/or an FPGA like FPGA 240. The traffic flow of captured data packets may be received via, for example, a mirror port like mirror port 160 and/or a traffic capture point located along a communication link between two communicating devices like traffic capture point 165. The traffic flow of captured data packets may be received at a rate of, for example, 1 gigabit per second, 10 gigabits per second, 40 gigabits per second, 40 gigabits per second via dense wavelength-division multiplexing, and/or 100 gigabits per second.

In step 515, it may be determined whether a data packet is received via an inline capture point or a mirror port. When a data packet is received via an inline capture point the data packet may be echoed to an inline pair port resident on, for example, a network captured traffic distribution device like network captured traffic distribution device 130 (step 520). In some embodiments, an inline pair port may be an egress port resident in, for example, the network captured traffic distribution device like egress port 220.

Whether received via a mirror port or inline capture point, in step 525 the traffic flow of captured data packets, such as data packet 140, 145, and 300, may be scanned to determine whether one or more of the data packets includes, for example, a pattern of interest from step 405. Step 525 may be performed by, for example, an FPGA, such as FPGA 240, a pattern finder, such as pattern finder 245, and/or a TCAM, such as TCAM 255. In step 530, it is determined (e.g., through a comparison of the packet contents with the patterns of interest) whether or not a data packet including one or more patterns of interest is found. Step 530 may be performed by, for example, a FPGA, such as FPGA 240, a pattern finder, such as patter finder 245, and/or a TCAM, such as TCAM 255.

In step 535, a found data packet including one or more patterns may be isolated from the traffic flow of captured data packets. The isolation of step 535 may be performed by, for example, filtering out data packets including data patterns of interest from the traffic flow of captured data packets and forwarding the filtered data packets to an assigned egress port. In some cases the data packets that do not include data patterns of interest may be dropped or otherwise removed from the traffic flow of captured data packets. Another exemplary way the isolation of step 535 may be performed is by tagging, or otherwise labeling, a found data packet such that it is forwarded to a particular egress port assigned to found data packets.

In step 540, an egress port assigned to a found data packet may be determined. This determination may be based on, for example, information included in a found data packet, such as one or more of the detected pattern(s), an IP address, a port identifier, TCP information, a source identifier and/or a destination identifier. The determination of step 540 may be performed by, for example, flow filter 250 working in conjunction with, for example, TCAM 260.

In step 545, the isolated data packet may be transmitted to its assigned egress port. Step 545 may be performed by, for example, an ASIC such as ASIC 205 and/or a switch. The tagged data packet may then be transmitted to an external device, like external device 150, via one or more egress ports, such as egress port 220 (step 550).

Figure 6:
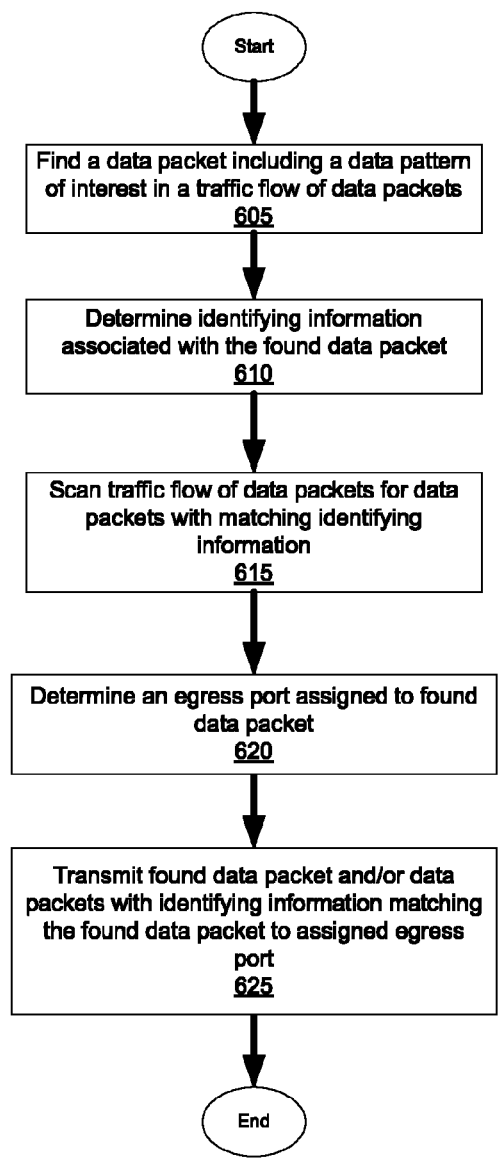
FIG. 6 is a flow diagram of an exemplary process for scanning a traffic flow for data packets including identifying information matching a data packet known to include a data pattern, in accordance with embodiments of the present invention.

FIG. 6 is a flow diagram of an exemplary process 600 for scanning a traffic flow for data packets including identifying information matching a data packet known to include a data pattern of interest. Process 600 may be executed by, for example, system 100 and/or network captured traffic distribution device 130.

In step 605, a data packet including a data pattern of interest may be found in a traffic flow of captured data packets via, for example, processes 400, 500, and/or 700. In step 610, identifying information associated with the found data packet may be determined via, for example, analyzing data packets. Exemplary identifying information included in a data packet may include, for example, an IP address, a port identifier, TCP information included in the data packet, a source port identifier, and a destination port identifier. Step 610 may be performed by, for example, an FPGA like FPGA 240 and/or pattern finder 245 in conjunction with TCAM 255. In some cases, the determined identifying information may be transferred to, for example, a flow filter such as flow filter 255. In step 615, a traffic flow of captured data packets may be scanned for data packets including identifying information matching the identifying information of the found data packet. Step 615 may be performed by, for example, a flow filter such as flow filter 250 and/or a TCAM such as TCAM 260.

In step 620, an egress port assigned to a found data packet may be determined. This determination may be based on, for example, information included in a found data packet, such as one or more of the detected pattern(s), identifying information, an IP address, a port identifier, TCP information, a source identifier and/or a destination identifier. The determination of step 620 may be performed by, for example, flow filter 250 working in conjunction with, for example, TCAM 260. The found data packet and/or any data packets with identifying information matching the identifying information of the found data packet may be transmitted to an assigned egress port, such as egress port 220, and may be further transmitted to an external device, like external device 150, via the assigned egress port (step 625). Step 625 may be performed by, for example, an ASIC such as ASIC 205, a processor such as processor 215, and/or a switch.

Figure 7:
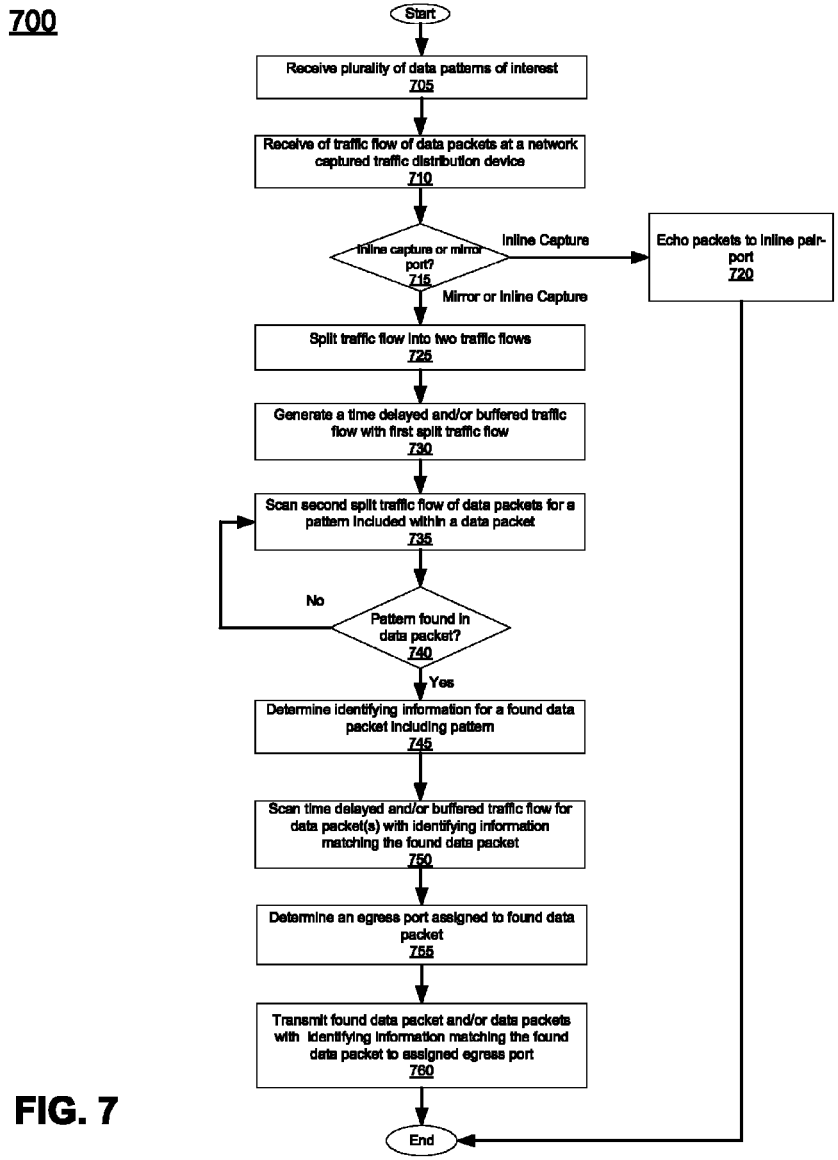
FIG. 7 is a flow diagram of an exemplary process for detecting a pattern within a data packet, in accordance with embodiments of the present invention.

FIG. 7 is a flowchart illustrating a process 700 for detecting a pattern in a data packet included a traffic flow of captured data packets. Process 700 may be executed by, for example, system 100 and/or network captured traffic distribution device 130.

In step 705, a plurality of data patterns of interest may be received by, for example, a network captured traffic distribution device such as network captured traffic distribution device 130 via, for example, an ingress port like ingress port 210 and/or a management port, like management port 230. The plurality of data patterns of interest may be specified by, for example, a user and/or administrator, like user and/or administrator 155. In some cases, the patterns of interest and/or execution of process 700 may be tailored to comply with, for example, a regulatory scheme and/or a legal requirement such as a privacy law, a wiretapping law, and/or a communications regulatory scheme. In some cases, the data patterns of interest may be stored in a memory such as TCAM 255.

In step 710, a traffic flow of captured data packets may be received by, for example, a network communication system like network communication system 100, a network captured traffic distribution device like network captured traffic distribution device 130, and/or an FPGA like FPGA 240. The traffic flow of captured data packets may be received via, for example, a mirror port like mirror port 160 and/or a traffic capture point located along a communication link between two communicating devices like traffic capture point 165. The traffic flow of captured data packets may be received at a rate of, for example, 1 gigabit per second, 10 gigabits per second, 40 gigabits per second, 40 gigabits per second via dense wavelength-division multiplexing, and/or 100 gigabits per second.

In step 715, it may be determined whether a data packet is received via an inline capture point or a mirror port. When a data packet is received via an inline capture point the data packet may be echoed to an inline pair port resident on, for example, a network captured traffic distribution device like network captured traffic distribution device 130 (step 720). In some embodiments, an inline pair port may be an egress port resident in, for example, the network captured traffic distribution device.

Whether received from a mirror port or through an inline capture point, in step 725 the traffic flow of captured data packets may be duplicated to produce two or more traffic flows (e.g., the original traffic flow of captured data packets and at least one other instance thereof, or, in some cases, at least two other instances thereof). In one embodiment, each of the two traffic flows includes the same data packets. Therefore, the "splitting" operation may be regarded as a copying or duplication operation in that the original traffic flow is copied or duplicated to produce a second instance thereof within the network captured traffic distribution device or a component thereof. In some cases, the two (or more) traffic flows will be identical, in that all of the packets of the original traffic flow will appear in all of the duplicate flows as well, but in other cases the various traffic flows may differ in that not all of the packets of the original flow will be present in all instances of the duplicate flows. For example, in some cases only selected packets that meet specified criteria will be instantiated in the duplicate flows. A splitter, such as splitter 270, may perform step 725. A time delayed and/or buffered traffic flow may be generated with the first split traffic flow (step 730). This time delayed and/or buffered traffic flow may be generated via transmitting the first split traffic flow to a buffer and/or a memory, like memory 265, storing each packet of the flow therein for some designated period of time and then retrieving the packets from the memory/buffer in the same sequence in which they were stored. The period of time delay and/or number of data packets that are buffered may be dependent upon the performance and/or configuration of the memory/buffer.

In step 735, the second split traffic flow may be scanned for one or more patterns included within a data packet. The patterns scanned for may include some, or all, of the patterns received in step 705. Step 735 may be performed by, for example, an FPGA, such as FPGA 240, a pattern finder, such as pattern finder 245, and/or a TCAM, such as TCAM 255. In some cases, pattern finder 245 may look up (e.g., in a look-up table) various patterns that are stored in TCAM 255.

In step 740, a pattern may be detected. When no pattern is detected, the traffic flow of captured data packets may continue to be scanned as in step 735. When a pattern of interest is detected, identifying information for the subject data packet in which the pattern is located (referred to as a "found data packet" elsewhere in this discussion) may be determined (step 745). Exemplary identifying information included in a data packet may include, for example, an IP address, a port identifier, TCP information included in the data packet, a source port identifier, and a destination port identifier. Step 745 may be performed by, for example, an FPGA like FPGA 240 and/or pattern finder 245 in conjunction with TCAM 255. In some cases, the determined identifying information may be transferred to, for example, a flow filter such as flow filter 255.

In step 750, the first split traffic flow may be scanned for data packets with identifying information matching the identifying information of the found data packet. Step 750 may be performed by, for example, a flow filter such as flow filter 250 and/or a TCAM such as TCAM 260. In step 755, an egress port assigned to the found data packet may be determined. Step 755 may be performed by, for example, flow filter 250 working in conjunction with TCAM 260. TCAM 260 may be pre-programmed with configuration information including, for example, associations between types of data patterns of interest and assigned egress ports.

In step 760, the found data packet may be tagged with an egress port ID based upon the egress port determined in step 755. Step 760 may be performed by, for example, flow filter 250. The found and tagged data packet may then be transmitted to an ASIC, such as ASIC 205, and/or a switch and may then be transmitted to its assigned egress port, such as egress ports 220 (step 765).

Figure 8:
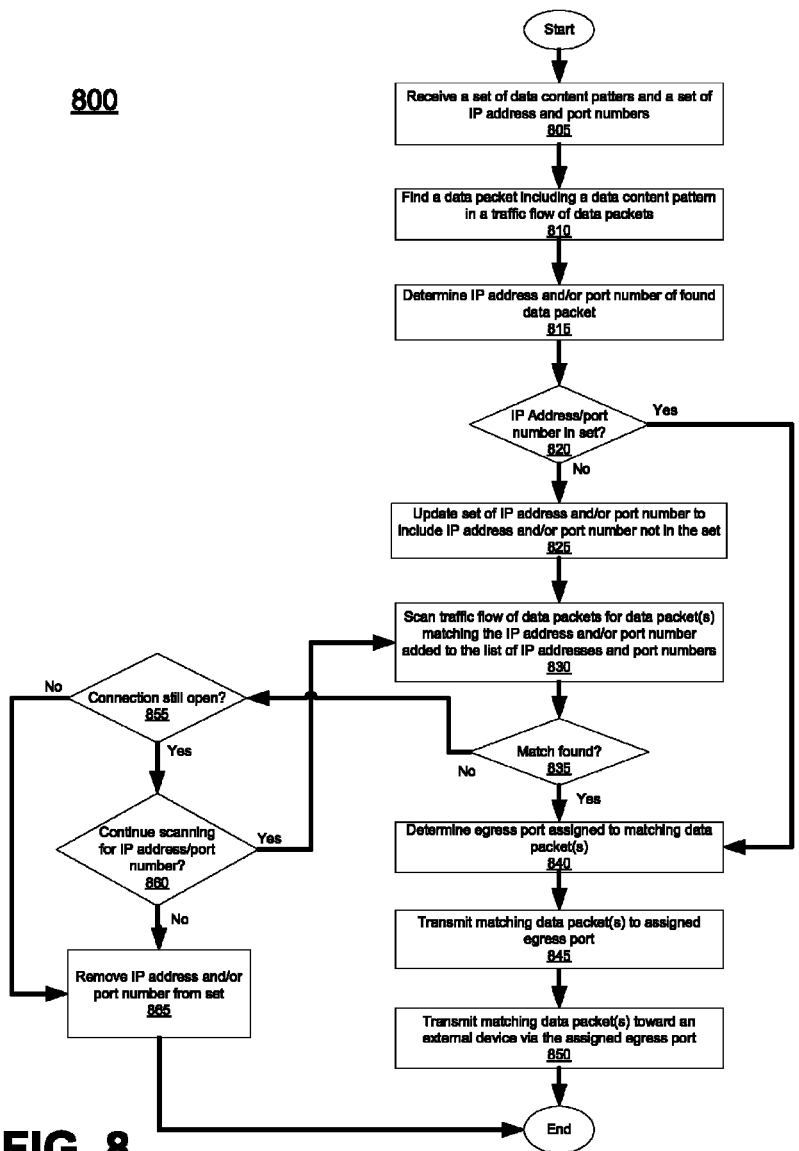
FIG. 8 is a flow diagram of an exemplary process for a process of adding an IP address/port number of a found data packet to a list of IP addresses/port numbers and searching a traffic flow for data packets for data packets with a matching IP address, source port number, and/or destination port number, in accordance with embodiments of the present invention.

FIG. 8 is a flow diagram of an exemplary process 800 for a process of updating a set of an IP addresses, source port numbers, and/or destination port numbers. Process 800 may be executed by, for example, system 100 and/or network captured traffic distribution device 130.

In step 805, a set of data content patterns and a set of IP addresses, source port numbers, and destination port numbers of interest may be received at, for example, a network capture traffic distribution device, like network captured traffic distribution device 130. In step 810, a data packet including a data pattern of interest may be found in a traffic flow of captured data packets via, for example, processes 400, 500, and/or 700. In step 815, an IP address, source port number, and/or destination port number of the found data packet may be determined. Step 815 may be performed by, for example, an FPGA like FPGA 240 and/or pattern finder 245 in conjunction with TCAM 255 via, for example, a look up function. In some cases, the determined IP address, source port number, and/or destination port number may be transferred to, for example, a flow filter such as flow filter 255.

Next, in step 820, it may be determined whether IP address, source port number, and/or destination port number associated with the found data packet is included in the received set of IP addresses, source port numbers, and/or destination port numbers of interest. Step 820 may be performed via, for example, a lookup function. When a IP address, source port number, and/or destination port number associated with the found data packet is included in the set of IP addresses, source port numbers, and/or destination port numbers of interest, an egress port assigned to the found data packet may be determined (step 840).

When a IP address, source port number, and/or destination port number associated with the found data packet is not included in the set of IP addresses, source port numbers, and/or destination port numbers of interest, the set of IP addresses, source port numbers, and/or destination port numbers may be updated to include an IP address, source port number, and/or destination port number associated with the found data packet but not included in the set of IP addresses, source port numbers, and/or destination port numbers of interest (step 825). In some cases, step 825 may include forwarding the IP address, source port number, and/or destination port number to a flow filter like flow filter 250. The updated set of IP addresses, source port numbers, and port numbers may be stored on a TCAM, like TCAM 260.

In step 830, a traffic flow of captured data packets may be scanned in order to find data packets with an IP address, source port number, and/or destination port number matching the determined IP address, source port number, and/or destination port number. In some embodiments, step 830 is performed by a flow filter, like flow filter 250. In step 835, it is determined whether a matching data packet is found. When a matching data packet is not found, it may be determined whether a connection for transmission of a flow of captured traffic is still open (step 855). For example, when a user is communicating with a website or sending an email, the connection is open while the user is actively engaging with the website or sending the email. The connection may close when, for example, the user closes the connection, a time period of inactivity on the connection has passed in which case the connection may 'time out,' and/or there is a failure with the connection. When the connection is still open it may be determined whether to continue scanning the captured traffic flowing through the connection for data packets including a matching IP address, source port number, and/or destination port number (step 860). When scanning is to be continued, step 830 may be repeated. When scanning is not to be continued, or when the connection is closed, an IP address, source port number, and/or destination port number associated with the connection may be removed from the set (step 865) and process 800 may end.

When a matching data packet is found, an egress port assigned to the matching data packet may be determined (step 840). This determination may be based on, for example, information included in a found data packet, such as one or more of the detected pattern(s), an IP address, a port identifier, TCP information, a source identifier and/or a destination identifier. The determination of step 840 may be performed by, for example, flow filter 250 working in conjunction with, for example, TCAM 260 via, for example, a lookup function.

In step 845, the matching data packet(s) may be transmitted to its assigned egress port. Step 845 may be performed by, for example, an ASIC such as ASIC 205 and/or a switch. The matching data packet(s) may then be transmitted toward an external device, like external device 150, via one or more egress ports, such as egress port 220 (step 850). Following steps 865 and/or 850, process 800 may end.

Thus, systems, methods, and apparatus for detecting a pattern within a data packet have been herein disclosed.

What is claimed is:

1. A method, comprising:
   receiving, at a network captured traffic distribution device, a plurality of data patterns of interest;
   receiving, at the network captured traffic distribution device, a traffic flow of captured data packets, the captured data packets being at least one of a copy and a representation of the data packets flowing through a communication network, wherein the captured data packets are received via at least one of a mirror port resident on a source of the captured data packets and a traffic capture point located along a communication link between two communicating devices, and the network captured traffic distribution device includes a plurality of ingress and egress ports;
   scanning data packets of the traffic flow of captured data packets to find a data packet including a data pattern of interest and, for any found data packets, determining identifying information therefrom;
   scanning data packets of the traffic flow to find one or more data packets with identifying information matching identifying information of a found data packet;
   determining an egress port of the network captured traffic distribution device assigned to the found data packet based upon the data pattern of interest detected in the found data packet; and
   transmitting the found data packet and any data packets having matching identifying information to the assigned egress port.

2. The method of claim 1, further comprising tagging the found data packet and any data packets having matching identifying information with egress port identifiers; and wherein the determination of an egress port assigned to the found data packet is made on the basis of the egress port identifier.

3. The method of claim 1, wherein the found data packet and any data packets having matching identifying information are associated with at least one of an email communication, a communication with a web site, and a communication within a network.

4. The method of claim 1, wherein the data patterns of interest are tailored to comply with at least one of a regulatory scheme, a privacy policy, a communication protocol, and a legal requirement.

5. The method of claim 1, wherein the traffic flow of captured data packets is received at a rate of at least one of 10 megabit per second, 100 megabit per second, 1 gigabit per second, 10 gigabits per second, 40 gigabits per second, 40 gigabits per second via dense wavelength-division multiplexing, and 100 gigabits per second.

6. The method of claim 1, wherein the identifying information is at least one of an Internet Protocol address, a port identifier, Transmission Control Protocol (TCP) information, a virtual local area network (VLAN) tag, a source port identifier, and a destination port identifier.

7. The method of claim 1, wherein only a portion of the found data packet and any data packets having matching identifying information that includes the received pattern is transmitted to the assigned egress port.

8. The method of claim 1, wherein the determination of an egress port is made on the basis of which of the data patterns of interest is present in the found data packet.

9. A method, comprising:
   receiving, at a network captured traffic distribution device, a plurality of data patterns of interest;
   receiving, at the network captured traffic distribution device, a traffic flow of captured data packets, wherein the data packets are received via at least one of a mirror port resident on a source of the captured data packets and a traffic capture point located along a communication link between two communicating devices, and the network captured traffic distribution device includes a plurality of ingress and egress ports;
   producing from the traffic flow of captured data packets a duplicate traffic flow of captured data packets;
   generating a time delayed traffic flow using either the traffic flow of captured data packets or the duplicate traffic flow of captured data packets;
   scanning data packets of the traffic flow of captured data packets to find a data packet including a data pattern of interest and, for any found data packets, determining identifying information therefrom;
   scanning data packets of the time delayed traffic flow to find one or more data packets with identifying information matching identifying information of a found data packet; determining an egress port of the network captured traffic distribution device assigned to the found data packet; and
   transmitting the found data packet and any data packets having matching identifying information to the assigned egress port.

10. The method of claim 9, further comprising tagging the found data packet and any data packets having matching identifying information with egress port identifiers; and wherein the determination of an egress port assigned to the found data packet is made on the basis of the egress port identifier.

11. The method of claim 9, wherein the found data packet and any data packets having matching identifying information are associated with at least one of an email communication, a communication with a web site, and a communication within a network.

12. The method of claim 9, wherein the data patterns of interest are tailored to comply with at least one of a regulatory scheme, a privacy policy, a communication protocol, and a legal requirement.

13. The method of claim 9, wherein the traffic flow of captured data packets is received at a rate of at least one of 10 megabit per second, 100 megabit per second, 1 gigabit per second, 10 gigabits per second, 40 gigabits per second, 40 gigabits per second via dense wavelength-division multiplexing, and 100 gigabits per second.

14. The method of claim 9, wherein the identifying information is at least one of an Internet Protocol (IP) address, a port identifier, transmission control protocol (TCP) information, a virtual local area network (VLAN) tag, a source port identifier, and a destination port identifier.

15. The method of claim 9, wherein only a portion of the found data packet that includes the received pattern is transmitted to the assigned egress port.

16. The method of claim 9, wherein the determination of an egress port is made on the basis of which of the data patterns of interest is found in the data packet.

17. A network captured traffic distribution device comprising:
a plurality of ingress ports for receiving a traffic flow of captured data packets from a source of captured data packets and transmitting the traffic flow of captured data packets to a splitter; a plurality of egress ports for transmitting data from the network captured traffic distribution device;
the splitter communicatively coupled to at least one of the ingress ports, wherein the splitter is configured to receive the traffic flow of captured data packets and duplicate data packets of the traffic flow;
a first memory, communicatively coupled to the splitter, for buffering data packets, from either the traffic flow or a duplicated traffic flow, thereby providing a time-delayed traffic flow;
at least one of a field programmable gate array (FPGA) and a processor, communicatively coupled to the first memory, for scanning data packets included in the traffic flow or the duplicated traffic flow to find a data packet including a pattern of interest, determining identifying information for a found data packet, scanning data packets of the time delayed traffic flow to find one or more data packets having identifying information matching that of the found data packet, and determining an egress port assigned to the found data packet; and
a second memory, communicatively coupled to the at least one FPGA and processor, for storing information for determining the egress port assigned to the found data packet.

18. The network captured traffic distribution device of claim 17, wherein the second memory includes a look-up table associating each data pattern of interest with a respective one of the egress ports.

19. The network captured traffic distribution device of claim 17, wherein the second memory is a ternary content-addressable memory (TCAM).

20. The network captured traffic distribution device of claim 17, wherein the FPGA comprises:
a pattern finder for scanning data packets using the pattern of interest and determining the identifying information for the found data packet; and
a flow filter for scanning data packets of the time delayed traffic flow and determining the egress port assigned to the found data packet.

* * * * *